Patented Aug. 7, 1934

1,969,146

UNITED STATES PATENT OFFICE 1,969,146

MOLDABLE COMPOSITION

Morris Omansky, Boston, Mass., assignor to E. W. Colledge, General Sales Agent, Inc., Jacksonville, Fla., a corporation of Florida No Drawing. Application December 6, 1930, Serial No. 500,676

2 Claims. (Cl. 106—22)

This invention relates to a moldable composition.

The invention has for an object to provide a novel moldable composition having a phenolic resin as a base, and which may be economically made and possesses characteristics rendering it particularly suitable for the production of molded articles.

With this general object in view and such others as may hereinafter appear, the invention consists in the moldable composition hereinafter described and particularly defined in the claims at the end of this specification.

In the production of many different molded products and articles, varous moldable compositions have heretofore been employed having phenolic resins as their base, such for example as those moldable compositions having phenol-formaldehyde resins as their base. Such moldable compositions also have had incorporated therein, a filler such as wood flour and the commercial value of such compositions depends to a large extent upon the ability of the material to flow and conform exactly to the shape of the mold in which the molded article or product is produced. In addition, for some commercial purposes and for the production of molded products for certain uses, it has been recognized as desirable to incorporate larger amounts of a filler such as wood flour in the moldable composition, and difficulty has heretofore been experienced in maintaining the degree of flowability and moldability of the composition requisite for the production of satisfactory articles when the proportion of filler has been increased beyond a certain point.

I have discovered that an improved moldable composition utilizing a phenolic resin as a base may be produced by incorporating into such a composition a relatively small proportion of pine tar, that is a tar obtained in a kiln or retort by the destructive distillation of pine. I have found by experiment that such a phenolic resin composition possesses much greater flowability than a comparable composition of the prior art and conforms better in accurate detail to the exact shape of the mold, and consequently enables more valuable and perfect molded articles to be produced than other comparable prior compositions of this type of which I am aware. The phenolic resin which may be used in the production of the present product may be of itself plastic, or may, if found advantageous, be of the type which is not plastic at ordinary temperatures, and I have discovered that by the use of a relatively small proportion of pine tar both types of resins are plasticized and an improved moldable composition produced having the desirable characteristics above mentioned. As above stated, in some instances, and for the production of molded products for certain purposes, a filler such as finely divided wood flour may and preferably will be incorporated into the phenolic resin composition, and when such filler is used I have found that substantially larger amounts of the filler may be successfully incorporated into the mass while obtaining a moldable composition which may readily flow and which will conform in detail to the exact shape of the mold with more facility than other similar compositions in which pine tar is not incorporated.

As an example of a plastic composition embodying the present invention, I prefer to incorporate the following materials in the following proportions by weight:

| | Parts |
|---|---|
| Phenolic resin | 4 |
| Wood flour | 3 |
| Powdered charcoal | 6 |
| Pine tar | 0.5 |

In practice the phenolic resin may and preferably will comprise any of the known commercial forms of phenol-formaldehyde resins, which may be regarded as plastic phenolic-resins, although for certain purposes non-plastic types of phenolic resins may be employed and varying amounts of pine tar utilized for plasticizing purposes, depending upon the characteristics of the particular resin employed.

It has been found that the foregoing materials may be easily mixed together and readily molded and the molded articles may be removed from the mold without staining the mold, and when removed are absolutely dry and not tacky. Even when hot no odor of pine tar is discernible. The pine tar has been found to be a most effective plasticizer for phenolic resins and serves to permit the use of relatively large portions of the filler for the production of certain kinds of molded products such as steering wheels for automobiles, radio panels, cash carrier cups, and closet seats, and because of the relatively large proportion of filler the composition lends itself to the economical manufacture of such products.

The charcoal imparts to the plastic mass a true and permanent black color and also relatively large proportions thereof may be used because of the presence of the pine tar in the phenolic resin composition, producing a moldable composition superior to other prior compositions of which I am aware for the production of general molded products.

While the preferred moldable composition has been herein illustrated and described, it will be understood that the invention contemplates the production of other compositions within the scope of the following claims.

Having thus described the invention what is claimed is:—

1. A moldable composition containing a phenol-formaldehyde resin, finely divided charcoal, wood flour, and pine tar in substantially the following proportions:

| | Parts |
|---|---|
| Phenolic resin | 4 |
| Charcoal | 6 |
| Wood flour | 3 |
| Pine tar | 0.5 |

2. A moldable composition comprising a phenolic resin base, a filler and a small amount of pine tar as a plasticizer, the proportion of filler being substantially higher than the maximum proportion heretofore permissible in comparative prior phenolic base compositions, said composition being further characterized by superior flowability and moldability.

MORRIS OMANSKY.